(12) United States Patent
Dong et al.

(10) Patent No.: US 9,819,431 B2
(45) Date of Patent: *Nov. 14, 2017

(54) METHOD AND APPARATUS FOR TRANSPORTING CLIENT SIGNALS IN AN OPTICAL TRANSPORT NETWORK

(71) Applicant: Huawei Technologies Co., Ltd., Shenzhen, Guangdong (CN)

(72) Inventors: Limin Dong, Shenzhen (CN); Qiuyou Wu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 516 days.

This patent is subject to a terminal disclaimer.

(21) Appl. No.: 14/339,734

(22) Filed: Jul. 24, 2014

(65) Prior Publication Data

US 2014/0334503 A1 Nov. 13, 2014

Related U.S. Application Data

(63) Continuation of application No. 13/281,280, filed on Oct. 25, 2011, now Pat. No. 8,824,505, which is a (Continued)

(30) Foreign Application Priority Data

Apr. 17, 2007 (CN) .......................... 2007 1 0090273

(51) Int. Cl.
*H04J 3/16* (2006.01)
*H04J 3/24* (2006.01)

(52) U.S. Cl.
CPC .......... *H04J 3/1652* (2013.01); *H04J 3/1658* (2013.01); *H04J 3/1664* (2013.01)

(58) Field of Classification Search
None
See application file for complete search history.

(56) References Cited

U.S. PATENT DOCUMENTS 7,848,653 B2 12/2010 Zou
8,824,505 B2 * 9/2014 Dong .................... H04J 3/1652
370/466

(Continued)

FOREIGN PATENT DOCUMENTS

CN 1734986 A 2/2006
CN 1770673 A 5/2006

(Continued)

OTHER PUBLICATIONS

Office Action issued in corresponding U.S. Appl. No. 12/622,973, (dated Aug. 15, 2013).

(Continued)

*Primary Examiner* — Jutai Kao
(74) *Attorney, Agent, or Firm* — Leydig, Volt & Mayer, Ltd.

(57) ABSTRACT

Method and apparatus for transporting client signals in an MN are illustrated. In one embodiment, the method includes: mapping a client signal into a first Optical Channel Data Tributary Unit (ODTU) frame including an ODTU payload area and an ODTU overhead area, such that a plurality of n-bit data units of the client signal are inserted into the ODTU payload area and number information is inserted into the ODTU overhead area; mapping the first ODTU frame into the OPUk frame, such that the plurality of n-bit data units are mapped into an OPUk payload part occupying at least one Tributary Slot (TS) of the OPUk payload area and the number information of the ODTU overhead area is mapped into a first OPUk overhead part of the OPUk frame; forming an Optical Channel Transport (Continued)

Unit-k (OTUk) frame including the OPUk frame for transmission.

30 Claims, 9 Drawing Sheets

Related U.S. Application Data continuation of application No. 12/622,973, filed on Nov. 20, 2009, now abandoned, which is a continuation of application No. PCT/CN2008/070718, filed on Apr. 16, 2008.

(56) References Cited

U.S. PATENT DOCUMENTS

| | | | |
|---|---|---|---|
| 2003/0048813 A1 | 3/2003 | Lahav et al. | |
| 2004/0013129 A1 | 1/2004 | Fang et al. | |
| 2004/0156325 A1* | 8/2004 | Perkins | H04J 3/07 370/299 |
| 2005/0078685 A1 | 4/2005 | MacLean et al. | |
| 2006/0104309 A1 | 5/2006 | Vissers et al. | |
| 2007/0071443 A1 | 3/2007 | Fukumitsu | |
| 2007/0076767 A1 | 4/2007 | Loprieno et al. | |
| 2007/0076769 A1* | 4/2007 | Zou | H04J 3/1658 370/539 |
| 2007/0104485 A1 | 5/2007 | Zhang et al. | |
| 2007/0248121 A1 | 10/2007 | Zou | |
| 2008/0075113 A1 | 3/2008 | Harley et al. | |

FOREIGN PATENT DOCUMENTS

| | | |
|---|---|---|
| CN | 1790993 A | 6/2006 |
| CN | 1791057 A | 6/2006 |
| EP | 1657839 A1 | 5/2006 |
| EP | 1737147 A1 | 12/2006 |
| EP | 1826926 A1 | 8/2007 |
| RU | 2289207 C1 | 12/2006 |
| WO | WO 2006009732 A1 | 1/2006 |
| WO | WO 2006015549 A1 | 2/2006 |
| WO | WO 2006063521 A1 | 6/2006 |

OTHER PUBLICATIONS

Bellato et al., "Enabling GMPLS control of G.709 Optical Transport Networks, Architectural Framework," CCAMP Working Group, Internet Engineering Task Force, Internet Society, Reston, Virginia (Nov. 2001).

Front page of corresponding granted Chinese Patent No. 102098595 (Application No. 201110052167.9) citing prior art at Item (56) (Nov. 7, 2012).

1$^{st}$ Office Action in corresponding Chinese Patent Application No. 201110052167.9 (dated Feb. 3, 2012).

1$^{st}$ Office Action of parent U.S. Appl. No. 12/622,973 (dated Oct. 28, 2011).

European Search Report for Application No. 08734076.6 (dated Jul. 30, 2010).

Office Action of Chinese Patent Application No. 200710090273.x (dated Apr. 27, 2010).

English Translation of Written Opinion of International Patent Application No. PCT/CN2008/070718 (dated Jul. 31, 2008).

Brugard, "G.709 Living List," International Telecommunication Union, Geneva, Switzerland (May 19, 2006).

"Interfaces for the Optical Transport Network (OTN)," Series G:Transmission Systems and Media, Digital Systems and Networks; Digital Terminal Equipments-General; Series Y: Global Information Infrastructure and Internet Protocol Aspects; Internet Protocol Aspects-Transport, ITU-T G.709/Y.1331, International Telecommunication Union, Geneva, Switzerland (Mar. 2003).

International Search Report for PCT Application No. PCT/CN2008/070718 (dated Jul. 31, 2008).

European Search Report for European Patent Application No. 11168964.2 (dated Aug. 2, 2011).

Liu et al., "The Mapping and Multiplexing of Client Signals in OTN," Study on Optical Communications, vol. 117, No. 3, pp. 8-11 (Jun. 2003).

Final Office Action issued in corresponding U.S. Appl. No. 13/281,280 (dated Dec. 5, 2012).

Office Action issued in corresponding U.S. Appl. No. 13/281,280(dated Jun. 24, 2013).

U.S. Appl. No. 13/281,280, filed Mar. 6, 2012.

Rejection Decision in corresponding Chinese Application No. 200710124235.1 (dated Jun. 12, 2010).

Final Office Action in corresponding U.S. Appl. No. 12/622,973 (dated Dec. 27, 2013).

\* cited by examiner

Column

| Row | 15 | 16 | 17 ... 3824 |
|---|---|---|---|
| 1 | | Cbyte | |
| 2 | | Cbyte | OPUk payload area (4*3808+1 bytes) |
| 3 | | Cbyte | |
| 4 | PSI | | |

FIG. 1(Prior Art)

| Row | Column | 15 | 16 | 17 | 18 | 19 | 20 | 21 | 22 | ... | 3823 | 3824 |
|---|---|---|---|---|---|---|---|---|---|---|---|---|
| 11 | 1 | Cbyte | | | | | | | | | | |
| | 2 | Cbyte | | TS1 | TS2 | TS3 | TS4 | TS1 | TS2 | OPUk payload area (4*3808 bytes) | TS3 | TS4 |
| | 3 | Cbyte | | | | | | | | | | |
| | 4 | PSI | MFI-TS | | | | | | | | | |
| 00 | 1 | Cbyte | | | | | | | | | | |
| | 2 | Cbyte | | TS1 | TS2 | TS3 | TS4 | TS1 | TS2 | OPUk payload area (4*3808 bytes) | TS3 | TS4 |
| | 3 | Cbyte | | | | | | | | | | |
| | 4 | PSI | MFI-TS | | | | | | | | | |
| 01 | 1 | Cbyte | | | | | | | | | | |
| | 2 | Cbyte | | TS1 | TS2 | TS3 | TS4 | TS1 | TS2 | OPUk payload area (4*3808 bytes) | TS3 | TS4 |
| | 3 | Cbyte | | | | | | | | | | |
| | 4 | PSI | MFI-TS | | | | | | | | | |
| 10 | 1 | Cbyte | | | | | | | | | | |
| | 2 | Cbyte | | TS1 | TS2 | TS3 | TS4 | TS1 | TS2 | OPUk payload area (4*3808 bytes) | TS3 | TS4 |
| | 3 | Cbyte | | | | | | | | | | |
| | 4 | PSI | MFI-TS | | | | | | | | | |
| 11 | 1 | Cbyte | | | | | | | | | | |
| | 2 | Cbyte | | TS1 | TS2 | TS3 | TS4 | TS1 | TS2 | OPUk payload area (4*3808 bytes) | TS3 | TS4 |
| | 3 | Cbyte | | | | | | | | | | |
| | 4 | PSI | MFI-TS | | | | | | | | | |
| 00 | 1 | Cbyte | | | | | | | | | | |
| | 2 | Cbyte | | TS1 | TS2 | TS3 | TS4 | TS1 | TS2 | OPUk payload area (4*3808 bytes) | TS3 | TS4 |
| | 3 | Cbyte | | | | | | | | | | |
| | 4 | PSI | MFI-TS | | | | | | | | | |

METHOD AND APPARATUS FOR TRANSPORTING CLIENT SIGNALS IN AN OPTICAL TRANSPORT NETWORK

CROSS-REFERENCE TO RELATED APPLICATIONS

This application is a continuation of U.S. patent application Ser. No. 13/281,280, filed Oct. 25, 2011, which is a continuation of U.S. patent application Ser. No. 12/622,973, filed Nov. 20, 2009. U.S. patent application Ser. No. 12/622,973 is a continuation of International Patent Application No. PCT/CN2008/070718, filed Apr. 16, 2008, which claims priority to Chinese Patent Application No. 200710090273.X, filed Apr. 17, 2007. The disclosures of all the prior applications are considered part of the disclosure of this application and are hereby incorporated by reference in their entireties.

FIELD OF THE INVENTION

The present invention relates to optical communications, and in particular, to method and apparatus for transporting client signals in an Optical Transport Network (OTN).

BACKGROUND

With the development of the economy, the demand for information is increasing rapidly. Optical fiber provides an enormous potential capacity of about 30 THz, and thus fiber communications has become one of the most important technologies for supporting growth of communication services. The OTN standard developed by the International Telecommunication Union—Telecommunication Standardization Sector (ITU-T) lays a foundation for constructing a basic OTN.

In an OTN, the technology for mapping and wrapping client signals to make them suitable for transmission in the OTN is called Digital Wrapping (DW) technology. DW technology involves technical means such as Optical Channel Transport Unit (OTU) mapping, multiplexing structures, time division multiplexing of Optical Channel Data Unit-k (ODUk), and client signal mapping.

Before transmitting client signals, it is necessary to map the client signals to an Optical Channel Payload Unit-j (OPUj), where j represents the supported bit rate and may have the values of 1, 2, or 3 which indicate a bit rate of about 2.5 Gbps, 10 Gbps, and 40 Gbps respectively, and add the overhead of the OPUj into the client signal to constitute an OPUj, and then add the channel overhead of the Optical Channel Data Unit (ODUj) into the OPUj to constitute an ODUj. The OTU overhead and the Forward Error Correction (FEC) overhead are added into the ODUj to constitute an Optical Channel Transport Unit-j (OTUj), and then the OTUj is loaded to a wavelength and sent out.

Time division multiplexing may be performed for the ODUj first so that the client signals can be transmitted through a transport channel with higher rates. Therefore, the G.709 recommendation defines an Optical Channel Payload Unit-k Tributary Slot (OPUk TS) and an Optical Channel Data Tributary Unit j into k (ODTUjk), where k represents the supported bit rate and is greater than j. On the basis of such definition, each byte of the ODUj is mapped to each byte of the ODTUjk in the asynchronous mode, and then the ODTUjk is mapped to the OPUk TS. Finally, an OTUk is constituted for transmitting.

In the step of mapping the client signal to the OPU, in order to transmit client signals of different types, the OTN specifications provide multiple service mapping methods such as mapping of the signals of a Constant Bit Rate (CBR), mapping of the Generic Framing Procedure (GFP) frame, and mapping of the Asynchronous Transfer Mode (ATM) cell flows, which are defined in the G.709. With the growth of data services, new requirements are raised for the full-rate transparent transmission capability of the OTN, and the application of the CBR mapping mode becomes more widespread.

The G.709 living list SP13 puts forward an agnostic CBR mapping method. FIG. 1 shows a frame structure suitable for this CBR mapping. Starting from the $15^{th}$ column, each OPUk frame includes: a 6-byte Cbyte, where the Cbyte indicates the number of bytes of the mapped client signal; an OPUk payload area composed of (4*3808+1) bytes, for storing client signals; and a 1-byte Payload Structure Identifier (PSI). On the basis of frame structure as shown in FIG. 1, the client signal is mapped to the payload area of the OTN frame of the agnostic CBR service through the existing $\Sigma$-$\varDelta$ algorithm.

In the process of implementing the present invention, the inventor finds that the existing agnostic CBR mapping method uses the fixed frame structure in FIG. 1 to map the client signals. When the rate of the client signal is lower than the nominal value of the OPUk, the positions not stuffed with client signals in the OPUk need to be stuffed with invalid bytes in order to meet the requirements of CBR transmission in the OTN system, thus leading to low bandwidth utilization ratio of the transmission channel Especially in the case that the client signal rate is low as compared with the nominal value of the OPUk, the OPUk needs to be stuffed with many invalid bytes, thus drastically reducing the bandwidth utilization ratio of the transmission channel In addition, the definition of the OPUk TS structure in the existing G.709 is limited to the multiplexing from the ODUj to the ODUk, and the existing G.709 defines only 4 OPUk TSs or 16 OPUk TSs as regards the TS allocation. Moreover, the existing G.709 defines only the mapping path of the SDH service as regards the mapping of the CBR service.

With the rapid development of data services, more and more information is transmitted over the Ethernet, Fiber Channel (FC), and Enterprise Systems Connection (ESCON) interface, and such interfaces provide numerous bit rates. For client signals having numerous bit rates, the OTN system defines only the CBR transmission channels and limited CBR mapping methods, and provides no flexible mapping method suitable for CBR transparent transmission of client signals having different bit rates.

SUMMARY

Embodiments of the present invention provide method and apparatus for transporting client signals in an OTN.

One embodiment of the present invention comprises a method for transmitting the client signals in the OTN. The method includes: receiving a client signal; determining a quantity of n-bit data units of the client signal based on a clock of the client signal and a local clock; mapping the quantity of n-bit data units of the client signal to an overhead of a first Optical Channel Data Tributary Unit (ODTU) frame; mapping the n-bit data units of the client signal to a payload area of a second ODTU frame next to the first ODTU frame according to the quantity of n-bit data units mapped in the overhead of the first ODTU frame; mapping each n-bit data unit of the second ODTU frame to an Optical Channel Payload Unit-k Tributary Slot (OPUk TS) in an OPUk frame; and forming an Optical Channel Transport Unit-k (OTUk) frame including the OPUk frame for transmission.

Another embodiment of the present invention comprises a method for receiving the client signals in the OTN. The method includes: receiving an Optical Channel Payload Unit-k (OPUk) frame that includes an OPUk payload area that is divided into multiple OPUk Tributary Slots (TSs); resolving the OPUk frame to obtain one of the multiple OPUk TSs; resolving the OPUk TS to obtain a first Optical Channel Data Tributary Unit (ODTU) frame that includes an overhead indicating a quantity of n-bit data units of a client signal, wherein the n-bit data units of the client signal are mapped to a payload area of a second ODTU frame next to the first ODTU frame; resolving the first ODTU frame to determine the quantity of n-bit data units of the client signal; resolving out clock information of the client signal according to the quantity of n-bit data units of the client signal; and demapping the client signal in the OPUk TS according to the quantity of n-bit data units and the clock information of the client signal.

Yet another embodiment of the present invention comprises a transmitter for transmitting the client signals in the OTN. The transmitter includes: a first unit configured to receive a client signal; a second unit configured to determine a quantity of n-bit data units of the client signal based on a clock of the client signal and a local clock; a third unit configured to map the quantity of n-bit data units of the client signal to an overhead of a first Optical Channel Data Tributary Unit (ODTU) frame; a fourth unit configured to map the n-bit data units of the client signal to a payload area of a second ODTU frame next to the first ODTU frame according to the quantity of n-bit data units mapped in the overhead of the first ODTU frame; a fifth unit configured to map each n-bit data unit of the second ODTU frame to an Optical Channel Payload Unit-k Tributary Slot (OPUk TS) in an OPUk frame; and a sixth unit configured to form an Optical Channel Transport Unit-k (OTUk) frame including the OPUk frame for transmission.

A further embodiment of the present invention comprises a receiver for receiving the client signals in the OTN. The receiver includes a first unit configured to receive an Optical Channel Payload Unit-k (OPUk) frame that includes an OPUk payload area that is divided into multiple OPUk Tributary Slots (TSs); a second unit configured to resolve the OPUk frame to obtain one of the multiple OPUk TSs and resolve the OPUk TS to obtain a first Optical Channel Data Tributary Unit (ODTU) frame that includes an overhead indicating a quantity of n-bit data units of a client signal, wherein the n-bit data units of the client signal are mapped to a payload area of a second ODTU frame next to the first ODTU frame; and a third unit configured to resolve the first ODTU frame to determine the quantity of n-bit data units of the client signal, resolve out clock information of the client signal according to the quantity of n-bit data units of the client signal, and demap the client signal in the OPUk TS according to the quantity of n-bit data units and the clock information of the client signal.

BRIEF DESCRIPTION OF THE DRAWINGS

FIG. 1 shows a structure of an OTN frame used in CBR mapping in the prior art;

FIG. 2 shows an OPUk aTS-4 frame structure according to an embodiment of the present invention;

FIG. 3 shows an OPUk aTS-11 frame structure according to an embodiment of the present invention;

DETAILED DESCRIPTION

Figure 4:
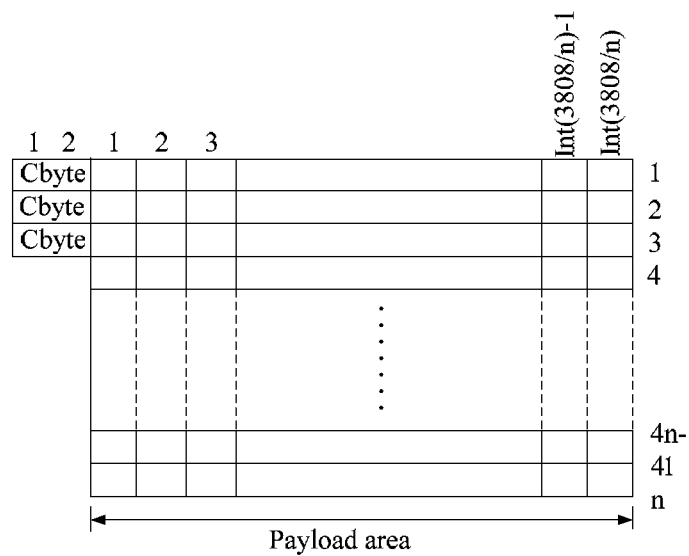
FIG. 4 shows an ODTUan-k frame structure according to an embodiment of the present invention.

In at least some embodiments of the present invention, the OPUk TSs are grouped and allocated according to the rate of different client signals on the basis of the OPUk frame structure. This is done to improve efficiency and flexibility of transmitting various client signals. The agnostic CBR mapping mode in the ITU-T SG15 G.709 living list is applied to implement transparent CBR transmission for various client signals of different rates.

A method for transmitting client signals in an OTN in an embodiment of the present invention includes: (1) obtaining the client signals, and determining an OPUk TS in an OPUk according to the client signals; (2) mapping the client signals to the OPUk TS in an agnostic CBR mapping mode; and (3) adding an overhead into the OPUk, and sending the OPUk with the added overhead to an OTN.

The step of determining the OPUk TS in the OPUk according to the client signals may include: (1) determining the number of OPUk TSs of the OPUk according to the type of the client signal and the bit rate of the OPUk; and (2) determining the OPUk TS by using the number of OPUk TSs as a cycle.

This step may further include: (1) stuffing the fixed byte positions of the OPUk with invalid data, so that the number of non-stuffed bytes of the OPUk is an integer multiple of the number of the OPUk TSs; (2) determining the number of the OPUk TSs according to the type of the client signals and the bit rate of the OPUk; and (3) determining the OPUk TS by using the number of the OPUk TSs as a cycle.

This step may further include: grouping the determined OPUk TSs of the OPUk, and letting the OPUk TSs in the same group constitute a channel for transmitting client signals.

The step of mapping the client signals to the OPUk TS in the OPUk in an agnostic CBR mapping mode may include: (1) determining the number of bytes of the first client signal according to the rate of the first client signal among the client signals and the OPUk TS rate corresponding to the first client signal; (2) mapping the number of bytes of the first client signal to the overhead of the OPUk TS corresponding to the first client signal; and (3) mapping the bytes of a client signal of this number of bytes to the OPUk TS corresponding to the first client signal.

The step of mapping the client signals to the OPUk TS in the OPUk in an agnostic CBR mapping mode may include: (1) mapping the first client signal among the client signals to the OPUk TS corresponding to the first client signal in an agnostic CBR mapping mode; and (2) mapping the second client signal among the client signals to the OPUk TS corresponding to the second client signal in a GFP mapping mode or an ATM cell mapping mode.

Preferably, the method may further include: adding a control identifier into the overhead added in the OPUk for at least one of the following purposes: identifying the OPUk TS corresponding to each client signal, identifying the number of OPUk TSs in the OPUk, identifying the type of the client signals mapped in the OPUk TS, and identifying the mode of mapping the client signal to the OPUk TS.

In order to make the present invention clearer to those skilled in the art, the following describes the present invention further in detail with reference to the accompanying drawings and preferred embodiments.

The frame structure according to at least some embodiments of the present invention is an improved frame structure based on the OPUk, and is called Optical Channel Payload Unit-k Agnostic tributary slot n (OPUk aTS-n), which refers to grouping into n agnostic TSs of the OPUk.

FIG. 2 shows an OPUk aTS-n frame structure according to an embodiment of the present invention. The improvement made by the present invention to the existing frame structure is described below with reference to FIG. 2.

FIG. 2 shows 6 OTN frames, which include 3808 columns numbered 17-3824. Each OTN frame includes four rows. Therefore, the OPUk payload area includes a total of 4×3808 bytes. As shown in FIG. 2, the OPUk frame in this embodiment is divided into 4 OPUk TSs (namely, the value of n is 4) to constitute an OPUk aTS-4 frame structure. Because 3808/4=952, the 3808 bytes in each row enable the 4 OPUk TSs to complete 952 cycles; one OPUk makes the 4 OPUk TSs complete (952×4=3808) cycles, namely, each OPUk TS of an OTN frame is available for transmitting 3808 bytes, and each OPUk TS needs to pass through 4 OTN frames in order to complete transmission of (3808×4) bytes.

The client signals are transmitted based on the frame structure shown in FIG. 2. If the value of k in the OPUk is 1, the frame rate is about 2.5 Gbps, and the transmission rate of each OPUk TS (accurate to 5 decimal places) is up to 0.62208 Gbps in the case that the OPUk is divided into 4 OPUk TSs. Likewise, if k=2, the frame rate is about 10 Gbps, and the transmission rate of each OPUk TS (accurate to 5 decimal places) is up to 2.49882 Gbps in the case that the OPUk is divided into 4 OPUk TSs.

The n (number) of OPUk TSs in the OPUk payload area depends on the rate of the client signal and the type and number of client signals so that each OPUk TS can use the agnostic CBR service mapping method to transmit each client signal transparently, and the maximum possible frequency offset of the client signals is tolerable. If it is impossible to divide the 3808 columns of the OPUk payload area into n OPUk TSs, certain columns in the OPUk payload area are stuffed fixedly. The number of columns to be stuffed is mod(3808/n).

Figure 3:
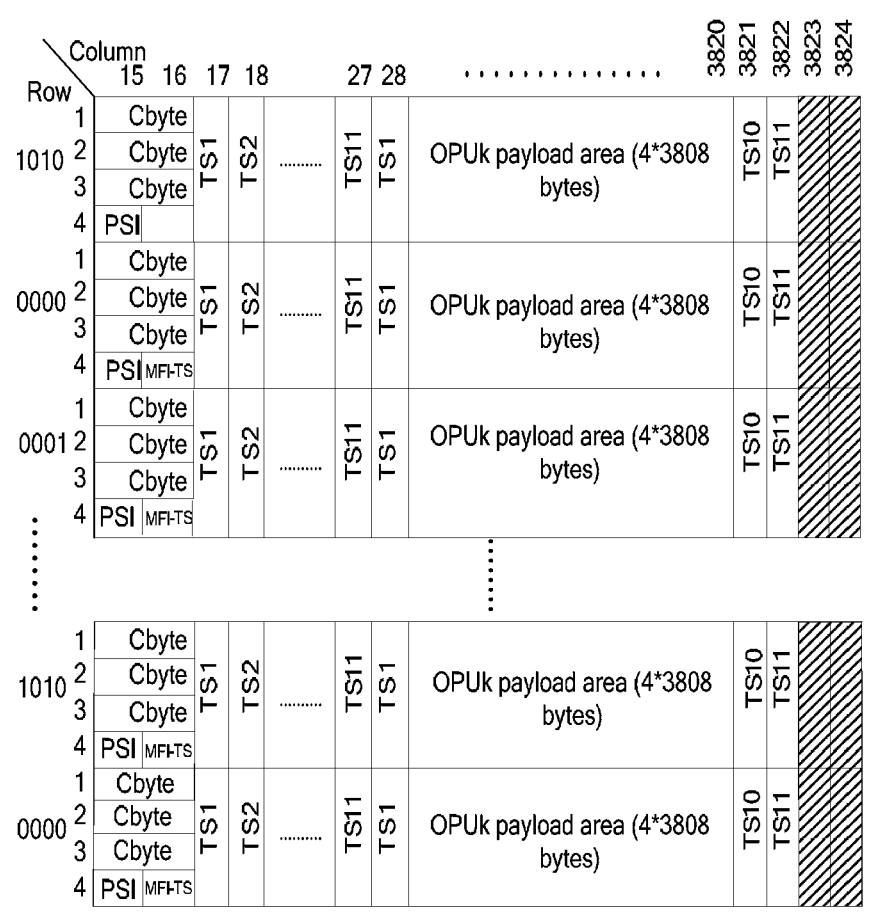

FIG. 3 shows an OPUk aTS-11 frame structure according to an embodiment of the present invention. As shown in FIG. 3, because mod(3808/n)=2, the last two columns (column 3823 and column 3824) in the OPUk payload area are stuffed with invalid data in this embodiment. After two bytes in each row are stuffed, the remaining 3806 bytes enable the 11 OPUk TSs to complete 346 cycles. After column 3823 and column 3824 are stuffed, the 11 OPUk TSs complete (346×4=1384) cycles, namely, each OPUk TS of an OTN frame completes transmission of 1384 bytes. FIG. 3 shows a method of stuffing column 3823 and column 3824 in the OPUk payload area. In this embodiment, the fixedly stuffed column in the OPUk payload area is placed at the end of the OPUk frame uniformly to facilitate identification. However, the embodiments of the present invention do not restrict the position of the fixedly stuffed column.

On the basis of the grouping of the OPUk TSs in the OPUk payload area, in order to be agnostic to the frame division, at least some embodiments of the present invention use reserved byte addition identifiers to indicate the grouping of the OPUk TSs in the OPUk payload area, including: payload type identifier, multi-frame identifier, identifier of the type of the client signal, and OPUk TS group identifier. The identifiers employed herein are introduced below.

The frame structure defined herein is identified by a PSI[0] byte (namely, Payload Type (PT) byte) defined in the existing OTN frame structure. For example, PSI[0] is set as a value which is idle in the prior art, and this value is used herein to indicate an agnostic OPUk frame structure composed of n OPUk TSs (abbreviated as OPUk aTS-n).

It is assumed that PSI[0]=13 indicates the OPUk aTS-n structure herein. In the case that PSI[0]=13, at least some embodiments of the present invention use the reserved overhead byte in the OPUk overhead (OH) to set the value of the PSI[1] (as shown in FIG. 3, the PSI occupies a byte in row 4 and column 15 of the frame). The PSI[1] value is adapted to indicate the number (n) of the OPUk TSs in the OPUk payload area.

A multi-frame indication method is used to indicate the OPUk TS corresponding to 3 Cbyte's of the current frame. Therefore, a multi-frame cycle identifier identical to the number of OPUk TSs is required. The byte in column 16 and row 4 may be used as an indication. Here, this byte is named as tributary slot MultiFrame Indicator (MFI-TS) of the OPUk TS. In the OPUk aTS-4 frame shown in FIG. 2, the MFI-TS byte increases by 1 for every frame until its number is the same as the number of the TSs in the OPUk (namely, its number is the same as the value of the PSI[1] byte), whereupon the counter is reset and the count starts over. For example, when the value of the MFI-TS byte indicates the first frame (the frame corresponding to 00 in FIG. 2), the 3 Cbyte's in this frame (a total of 6 bytes in rows 1-3 and columns 15-16) correspond to the first OPUk TSTS1; when the value of the MFI-TS byte indicates the second frame (the frame corresponding to 01 in FIG. 2), the 3 Cbyte's in this frame correspond to the second OPUk TSTS2, and so on.

In the OPUk aTS-4 frame structure as shown in FIG. 2, because mod(3808/4)=0, it is not necessary to stuff any column of the OPUk payload area. The MFI-TS circulates through 0-3. If MFI-TS=0, the 3 Cbyte's of the current frame correspond to TS1; if MFI-TS=3, the 3 Cbyte's of the current frame correspond to TS4. If the OPUk payload area is divided into 11 OPUk TSs, fixed stuffing needs to be performed for the mod(3808/11)=2 columns behind the OPUk payload area, and the structure of the 11 agnostic OPUk's (OPUk aTS-11) is as shown in FIG. 3. The MFI-TS circulates through 0-10. If MFI-TS=0, the 3 Cbyte's of the current frame correspond to TS1; if MFI-TS=10, the 3 Cbyte's of the current frame correspond to TS11.

The Cbyte is adapted to hold the number of bytes (Cn) of the client signals stuffed in the OPUk payload area.

The PSI[2m] byte indicates the type of the client signal mapped in the mOPUk TS, and the PSI[2m+1] indicates the group of the mOPUk TS. For example, PSI[4] and PSI[5] indicate TS2, and PSI[6] and PSI[7] indicate TS3.

Table 1 shows the relation between the PSI[2m] value and the type of the client signals mapped to the OPUk TS. Obviously, the relation between the value of the PSI[2m] and the type of the client signals may be set flexibly according to the service requirements, and such setting does not affect the essence of the present invention.

TABLE 1

| PSI[2m] value | Service type | Line rate (Gbps) |
|---|---|---|
| 01 | Enterprise system connection | 0.2 |
| 02 | Digital video broadcast | 0.216 |
| 03 | Fiber channel | 0.53125 |
| 04 | Fiber channel (FC-1G) | 1.065 |
| 05 | Gigabit Ethernet (GE) | 1.25 |
| 06 | High Definition Television | 1.485 |
| 07 | Fiber channel (FC-2G) | 2.125 |
| 08 | Synchronous Transfer Mode | 2.488320 |
| 09 | ODU1 | 2.498775 |
| 10-1f | Reserved | |
| 20 | Fiber channel (FC-4G) | 4.25 |
| 21 | Fiber channel (FC-8G) | 8.5 |
| 22 | Synchronous Transfer Mode | 9.95328 |
| 23 | ODU2 | 10.037273924 |
| 24 | Gigabit Ethernet (10 GE) | 10.3125 |
| 25 | Fiber channel (FC-10G) | 10.52 |
| 26-2f | Reserved | |
| 30 | Gigabit Ethernet (100 GE-5L) | 20.625 |
| 31 | Gigabit Ethernet (100 GE-4L) | 25.78125 |
| 32 | Synchronous Transfer Mode | 39.81312 |
| 33 | ODU3 | 40.319218983 |
| 34-FF | Reserved | |

If each OPUk TS transmits independent client signals respectively, each OPUk TS corresponds to a different PSI[2m+1] value, indicating that the OPUk TS is in a different group. If some OPUk TSs are bundled into a greater transmission channel for transmitting client signals, the same value is configured for the PSI[2m+1] byte of the bundled OPUk TS, indicating that such OPUk TSs are in the same group.

Table 2 shows an OPU4 which includes 11 unbundled OPUk TSs (OPUk aTS-11), and Table 3 shows an OPU4 which includes 11 OPUk TSs, of which the 4th-7th OPUk TSs are bundled for transmitting ODU3 signals. The PSI[8], PSI[10], PSI[12], and PSI[14] are of the same value "33", indicating that the type of the client signals is ODU3. The PSI[7], PSI[9], PSI[11], and PSI[13] are of the same value "4", indicating that the corresponding 4th-7th OPUk TSs belong to the same group numbered "4".

TABLE 2

| TSm | PSI[2m] | Client signal type | PSI[2m + 1] | Bundling state |
|---|---|---|---|---|
| TS1 | PSI[2] = 23 | ODU2 | PSI[1] = 1 | Not bundled |
| TS2 | PSI[4] = 23 | ODU2 | PSI[3] = 2 | Not bundled |
| TS3 | PSI[6] = 24 | 10GE LAN | PSI[5] = 3 | Not bundled |
| TS4 | PSI[8] = 23 | ODU2 | PSI[7] = 4 | Not bundled |
| TS5 | PSI[10] = 24 | 10GE LAN | PSI[9] = 5 | Not bundled |
| TS6 | PSI[12] = 25 | FC 10G | PSI[11] = 6 | Not bundled |
| TS7 | PSI[14] = 24 | 10GE LAN | PSI[13] = 7 | Not bundled |
| TS8 | PSI[16] = 24 | 10GE LAN | PSI[15] = 8 | Not bundled |
| TS9 | PSI[18] = 24 | 10GE LAN | PSI[17] = 9 | Not bundled |
| TS10 | PSI[20] = 25 | FC 10G | PSI[29] = 10 | Not bundled |
| TS11 | PSI[22] = 25 | FC 10G | PSI[21] = 11 | Not bundled |

TABLE 3

| TSm | PSI[2m] | Client signal type | PSI[2m + 1] | Bundling state |
|---|---|---|---|---|
| TS1 | PSI[2] = 24 | 10GE LAN | PSI[1] = 1 | Not bundled |
| TS2 | PSI[4] = 24 | 10GE LAN | PSI[3] = 2 | Not bundled |
| TS3 | PSI[6] = 23 | ODU2 | PSI[5] = 3 | Not bundled |
| TS4 | PSI[8] = 33 | ODU3 | PSI[7] = 4 | Bundled |
| TS5 | PSI[10] = 33 | ODU3 | PSI[9] = 4 | |
| TS6 | PSI[12] = 33 | ODU3 | PSI[11] = 4 | |
| TS7 | PSI[14] = 33 | ODU3 | PSI[13] = 4 | |
| TS8 | PSI[16] = 23 | ODU2 | PSI[15] = 5 | Not bundled |
| TS9 | PSI[18] = 23 | ODU2 | PSI[17] = 6 | Not bundled |
| TS10 | PSI[20] = 23 | ODU2 | PSI[29] = 7 | Not bundled |
| TS11 | PSI[22] = 25 | FC 10G | PSI[21] = 8 | Not bundled |

Table 4 shows definition of the PSI byte.

TABLE 4

| PSI byte | Resolution |
|---|---|
| PSI[0] | PSI[0] = 13, indicating agnostic CBR mapping structure of multiple OPUk TSs |
| PSI[1] | PSI[1] = n, indicating that the OPUk is divided into n + 1 OPUk TSs |
| PSI[2m] | Client signal type mapped to OPUk TS |
| PSI[2m + 1] | Corresponding OPUk TS group identifier |

Note:
$1 < n < 127$, $m = 1, 2, 3 \ldots n + 1$

Described above is a method for dividing an OPUk into multiple OPUk TSs. The OPUk aTS-n frame structure constructed according to the method introduced above is suitable for most types of client signals, especially, the signals of the Ethernet, FC, and ESCON services. Table 5 is a list of mapping relations between most services and the OPUk aTS-n rate. The OPUk TS mapping relations listed in Table 5 are relatively reasonable, and accomplish a high line utilization ratio. Such an OPUk aTS-n frame structure supports grouping of 2-127 OPUk TSs. Table 5 takes OPU1-OPU4 as an example.

TABLE 5

| Number of OPUk TSs | OPUk TS number of bytes | Fixedly stuffed column | OPU1 OPUk TS rate (Gbps) | Client signal type suitable for transmission | OPU2 OPUk TS rate (Gbps) | Client signal type for transmission | OPU3 OPUk TS rate (Gbps) | Client signal type for transmission | OPU4 OPUk TS rate (Gbps) | Client signal type for transmission |
|---|---|---|---|---|---|---|---|---|---|---|
| 2 | 1904 | 0 | 1.24416 | FC1G | 4.99764 | FC4G | 20.07526 | — | 60.74053 | — |
| 3 | 1269 | 1 | 0.82922 | — | 3.33088 | — | 13.37999 | 10GE LAN FC10G | 40.48305 | STM-256 ODU3 |
| 4 | 952 | 0 | 0.62208 | FC0.45 | 2.49882 | FC2G STM-16 | 10.03763 | FC8G STM-64 | 30.37027 | 100GE-4L |

TABLE 5-continued

| Number of OPUk TSs | OPUk TS number of bytes | Fixedly stuffed column | OPU1 OPUk TS rate (Gbps) | Client signal type suitable for transmission | OPU2 OPUk TS rate (Gbps) | Client signal type for transmission | OPU3 OPUk TS rate (Gbps) | Client signal type for transmission | OPU4 OPUk TS rate (Gbps) | Client signal type for transmission |
|---|---|---|---|---|---|---|---|---|---|---|
| 5 | 761 | 3 | 0.49727 | — | 1.99748 | — | 8.02378 | — | 24.27707 | 100GE-5L |
| 7 | 544 | 0 | 0.35547 | — | 1.42790 | GE | 5.73579 | — | 17.35444 | — |
| 9 | 423 | 1 | 0.27641 | — | 1.11029 | FC1G | 4.45999 | FC4G | 13.49435 | — |
| 10 | 380 | 8 | 0.24831 | — | 0.99743 | — | 4.00662 | — | 12.12258 | 100GE-10L |
| 11 | 346 | 2 | 0.22609 | DVB-ASI | 0.90818 | — | 3.64813 | — | 11.03793 | 10GE LAN ODU2 FC10G |
| 12 | 317 | 4 | 0.20714 | ESCON | 0.83206 | — | 3.34236 | — | 10.11279 | ODU2 |
| 14 | 272 | 0 | 0.177737143 | — | 0.71395 | — | 2.86789 | — | 8.677219 | FC8G |
| 17 | 224 | 0 | 0.14637 | — | 0.58796 | FC0.45 | 2.36180 | FC2G | 7.145945 | — |

It should be noted that, in Table 5, the OPUk TS rate unit is Gbps, the OPUk TS rate is accurate to five decimal places, and the OPU4 rate in this embodiment is supposed to be 121.48106 Gbps.

100 GE-4 L: 4×25 G 100 GE channel;
100 GE-5 L: 5×20 G 100 GE channel; and
100 GE-10 L: 10×10 G 100 GE channel The foregoing embodiment describes the OPUk aTS-n and the grouping of the OPUk TSs. With respect to the specific implementation approaches, the foregoing embodiment has many variations.

In the foregoing embodiment, if the PSI[0] value is 13, it indicates use of the OPUk aTS-n frame structure. In practice, however, the PSI[0] value is not necessarily 13. Those skilled in the art may use a value available in the prior art as the PSI[0] value for indicating use of the OPUk aTS-n frame structure.

In the foregoing embodiment, the value in the PSI[1] position is used to identify the number of grouped OPUk TSs. However, those skilled in the art may use another reserved field in the prior art to identify the number of grouped OPUk TSs.

In the foregoing embodiment, the PSI[2m] identifies the type of the client signals, and the PSI[2m+1] identifies the OPUk TS group mapped in the same OPUk TS. However, those skilled in the art may use another reserved field in the prior art to identify the type of the client signals and the OPUk TS group, and may define the mapping relation between the field value and the type of the client signals, and/or the value of each field, and the method of identifying the OPUk TS group as required. Such variations do not affect the implementation of the present invention.

The OPUk aTS-n frame structure is introduced above, and the following describes how to map the client signal to the frame of this structure, and transmit the client signal.

Before the client signal is mapped to the OPUk aTS-n frame structure, it is necessary to define the corresponding nOPUk TS agnostic to the k(ODTUan-k) frame structure according to the OPUk aTS-n frame structure, and the rate of the ODTUan-k frame structure is the same as the rate of the OPUk.

If the number of OPUk TSs in an OPUk is n, the ODTUan-k frame unit is a structure composed of 4 n rows and int(3808/n) columns. Moreover, 3 Cbyte spaces exist at the head of the structure, and each Cbyte space occupies 2 bytes, as shown in FIG. 4. Therefore, a Cbyte space that occupies two bytes can indicate a total of 65535 bytes, and an ODTUan-k unit has a total of 4n×int(3808/n)≤15232 bytes. Therefore, the Cbyte space that occupies two bytes is fully capable of indicating the payload bytes of the ODTUan-k frame.

Figure 5:
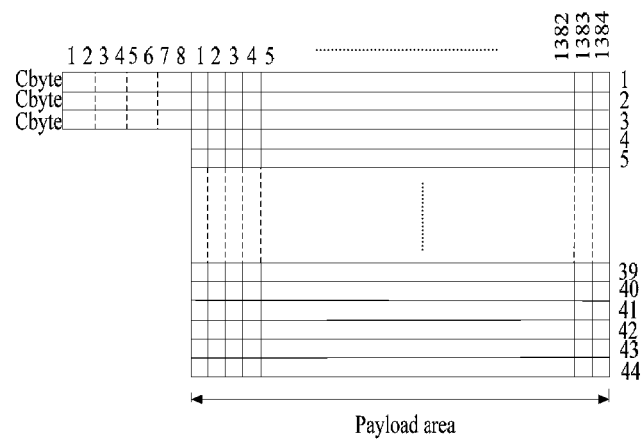
FIG. 5 shows a 4×ODTUa11-4 frame structure used for bundling four OPUk TSs according to an embodiment of the present invention.

As described above, this embodiment may bundle some OPUk TSs in the OPUk aTS-n frame structure to form a greater transmission channel for transmitting client signals of higher rates, thus fulfilling the requirements of transmitting different service types to the utmost. FIG. 5 shows how to bundle 4 of 11 OPUk TSs into 4×ODTUa11-k when the number of OPUk TSs of an OPUk is 11. When k=4, the PSI value is supposed to be the value in Table 3.

As shown in FIG. 5, the 4×ODTUa11-4 frame structure composed of 4 OPUk TSs has 3 Cbyte spaces, and each Cbyte space has 8 bytes, which are sufficient for indicating 1384×44 bytes.

The following embodiment describes how to map multiple client signals to the OTN frame provided herein transparently at a full rate through the agnostic CBR mapping method specified in the ITU-T SG15 G.709 living list.

It is assumed that the OPU4 is divided into 11 OPUk TSs. The first 10 OPUk TSs are used to transmit 10 GE LAN signals, and the 11th OPUk TS is used to transmit ODU2 signals. In this case, this embodiment inherits the OPUk aTS-n structure in the foregoing embodiment, and therefore, PSI[0]=13, and PSI[1]=11; and the byte allocation of the PSI[2m] and the PSI[2m+1] is shown in Table 6.

TABLE 6

| TSm | PSI[2m] | Client signal type | PSI[2m + 1] | Bundling state |
|---|---|---|---|---|
| TS1 | PSI[2] = 24 | 10GE LAN | PSI[1] = 1 | Not bundled |
| TS2 | PSI[4] = 24 | 10GE LAN | PSI[3] = 2 | Not bundled |
| TS3 | PSI[6] = 24 | 10GE LAN | PSI[5] = 3 | Not bundled |
| TS4 | PSI[8] = 24 | 10GE LAN | PSI[7] = 4 | Not bundled |
| TS5 | PSI[10] = 24 | 10GE LAN | PSI[9] = 5 | Not bundled |
| TS6 | PSI[12] = 24 | 10GE LAN | PSI[11] = 6 | Not bundled |
| TS7 | PSI[14] = 24 | 10GE LAN | PSI[13] = 7 | Not bundled |
| TS8 | PSI[16] = 24 | 10GE LAN | PSI[15] = 8 | Not bundled |
| TS9 | PSI[18] = 24 | 10GE LAN | PSI[17] = 9 | Not bundled |
| TS10 | PSI[20] = 24 | 10GE LAN | PSI[29] = 10 | Not bundled |
| TS11 | PSI[22] = 23 | ODU2 | PSI[21] = 11 | Not bundled |

For the transmitter of the client signal, the implementation process is as follows:

The transmitter receives ten 10 GE LAN signals and one ODU2 signal respectively, extracts the clocks of the signals, and compares the clocks with the local clocks to determine the Cn value of the signals. The transmitter maps the Cn value of each signal to the Cbyte space of the current ODTUa11-4 frame.

Figure 6:
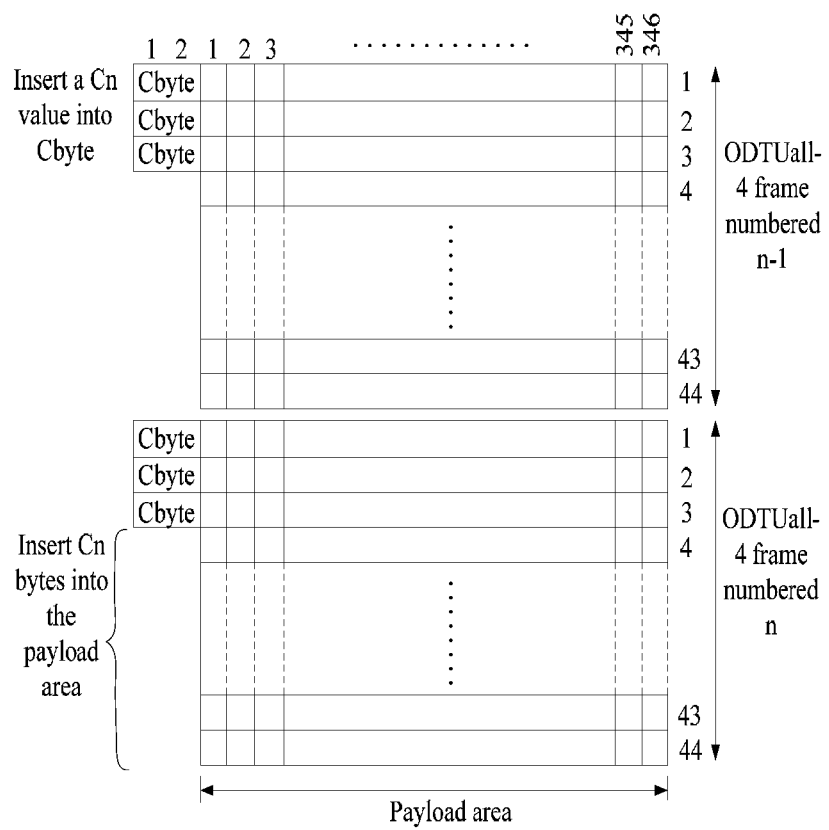
FIG. 6 shows the mapping of client signals of ODTUa11-4 according to an embodiment of the present invention.

At the frame next to the current ODTUa11-4 frame, according to the Cn value in the Cbyte space of the previous ODTUa11-4 frame, the transmitter maps the Cn bytes of each signal to the payload area of each ODTUa11-4 frame structure respectively based on the $\Sigma\text{-}\varDelta$ algorithm rule put forward in the agnostic CBR mapping method in the ITU-T SG15 G.709 living list. As shown in FIG. 6, if one ODU2 signal needs to be mapped to the ODTUa11-4 frame, at the $(n-1)^{th}$ ODTUa11-4 frame, the transmitter maps the Cn value determined in the received ODU2 signal to the Cbyte space; at the $n^{th}$ ODTUa11-4 frame, the transmitter maps the ODU2 signal of Cn bytes to the payload area of the ODTUa11-4 frame (346×44) according to the Cn value of the Cbyte space of the previous frame.

The byte rate of the ODTUa11-4 frame structure is the same as the byte rate of the OPU4 frame, and the client signal clock is asynchronous to the clock of the ODTUa11-4 frame. The Cn value is adjusted to compensate for the deviation between the asynchronous clocks.

The transmitter constructs an OPU4 aTS-11 frame structure, and maps each byte of the ODTUa11-4 frame structure (which is already mapped to the client signal) to each byte of the OPUk TS corresponding to the OPU4 aTS-11 frame structure.

In this embodiment, an OPU4 frame divided into 11 OPUk TSs can carry 11 ODTUa11-4 frame structures, of which 10 ODTUa11-4 frames are mapped to 10 GE LAN client signals and one ODTUa11-4 frame is mapped to the ODU2 signal.

The transmitter adds the overhead such as PSI byte and MFI-TS byte into the OPU4 aTS-11 frame to form an OTU4 line frame, which is sent to the OTN.

A method for receiving client signals in an OTN is provided in an embodiment of the present invention. The method includes: (1) receiving an OPUk, identifying an agnostic CBR mapping mode of an OPUk TS according to an overhead in the OPUk, and resolving the OPUk to obtain the OPUk TS; and (2) resolving the OPUk TS of the OPUk in the agnostic CBR mapping mode to obtain the client signals.

The method for resolving the OPUk TS of the OPUk in the agnostic CBR mapping mode to obtain the client signals includes: (1) resolving the overhead of the OPUk TS of the OPUk to obtain the number of bytes (Cn) of the corresponding client signal, and resolving the clock information of the corresponding client signal according to the number of bytes (Cn) of the client signal; and (2) demapping the client signals in the OPUk TS of the OPUk according to the number of bytes (Cn) and the clock information of the client signals, and recovering the client signals.

For the receiver, that the OTU4 line frame is received from the transmitter, the implementation process is as follows:

The receiver identifies the agnostic mapping mode of multiple OPUk TSs according to the PSI[0] byte in the OPU4, identifies the OPU4 aTS-11 frame according to the PSI[1] byte, identifies the mapped type of the client signals according to the value of the PSI[2m], identifies the unbundled OPUk TS according to the value of the PSI[2m+1], resolves the OPU4 aTS-11 into ODTUa11-4 frames according to the multi-frame number of the MFI-TS, resolves the ODTUa11-4 frame into the Cn value of each client signal, recovers the clock of 11 client signals according to the Cn value, and recovers data flows of ten 10 GE LAN signals and one ODU2 signal.

If the OPUk TS is bundled in this embodiment, the bundled OPUk TS corresponds to the 4×ODTUa11-4 structure as shown in FIG. 5. Therefore, on the occasion of mapping the 4×ODTUa11-4 frame structure byte to the 4 bundled OPUk TSs of the OPU4 aTS-11, the Cbyte space is split into 12 Cbyte spaces as indicated by the dotted line in FIG. 5 or based on other rules. In this way, the payload area is split into 4 parts, which are mapped to the 4 bundled OPUk TSs of the OPU4 aTS-11 respectively.

Those skilled in the art would recognize that all or part of the methods and devices of the disclosed embodiments of the present invention may be implemented by hardware (e.g., one or more processors) instructed by a program. The program may be stored in a computer-readable storage medium. The storage medium may be a Read-Only Memory (ROM)/Random Access Memory (RAM), magnetic disk, or Compact Disk (CD). When being executed, the program may perform the following steps: (1) obtaining the client signals, and presetting the OPUk TS in the OPUk according to the client signals; (2) mapping the client signals onto the preset OPUk TS of the OPUk in an agnostic CBR mapping mode; and (3) adding an overhead into the OPUk, and sending the OPUk to the OTN.

Optionally, a further step is: stuffing the corresponding fixed byte positions in each row of the OPUk payload area with invalid data so that the number of non-stuffed bytes in each row of the OPUk payload area is an integer multiple of the number (n) of the OPUk TSs.

Optionally, a further step is: (1) grouping the OPUk TSs in an OPUk, where the OPUk TSs in the same group make up a channel for transmitting client signals; (2) using the OPUk overhead byte to identify the grouping state; and (3) mapping a part of the client signals to the OPUk TSs of some OPUk's in the agnostic CBR mapping mode, and mapping the remaining client signals to the OPUk TSs of the remaining OPUk's in a GFP mapping mode or an ATM cell mapping mode.

Preferably, when being executed, the program may further perform this step: adding a control identifier into the overhead for at least one of the following purposes: identifying the OPUk TS corresponding to each client signal, identifying the number of OPUk TSs in the OPUk, identifying the type of the client signals mapped in the OPUk TS.

Preferably, the method further includes: using a control identifier added into the overhead to identify the mapping from the client signal to the OPUk TS.

Figure 7:
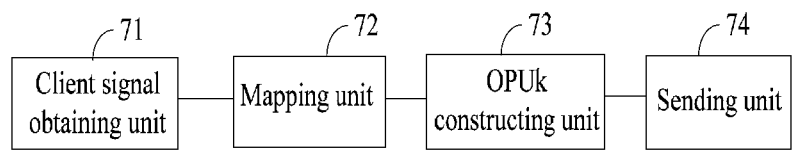
FIG. 7 shows a logical depiction of a client signal transmitting device according to an embodiment of the present invention.

As shown in FIG. 7, a device for transmitting client signals in an OTN according to an embodiment of the present invention includes: (1) a client signal obtaining unit 71, adapted to obtain client signals, and make statistics of the number of bytes of each client signal obtained by each OPUk TS within a frame; (2) a mapping unit 72, adapted to: map the number of bytes at the overhead byte of the OPUk, and map the client signals to the OPUk TS corresponding to the number of bytes according to the number of bytes; (3) an OPUk constructing unit 73, adapted to: preset the OPUk TS of the OPUk according to the client signals, and add a control identifier into the OPUk overhead byte for at least one of the following purposes: identifying the OPUk TSs that are preset in the OPUk payload area and correspond to the number of bytes, identifying the number (n) of OPUk TSs of the OPUk payload area, and identifying the type of the client signals mapped in the OPUk TS; and further adapted to add an OPUk TS group identifier in the overhead byte of the OPUk for indicating the group that includes the OPUk TS; and (4) a sending unit 74, adapted to send an ODUk that includes the OPUk.

The mapping unit 72 may map some client signals to the OPUk TSs of some OPUk's in an agnostic CBR mapping mode, and map the remaining client signals to the OPUk TSs of the remaining OPUk's in a GFP mapping mode or ATM cell mapping mode.

If the mapping unit 72 employs the agnostic CBR mapping mode, the mapping unit 72 needs to: (1) map the number of bytes of a client signal received within a frame to the OPUk TS overhead of the OPUk; (2) map each byte of this client signal to the payload area of the current OPUk TS frame according to the number of bytes of a client signal mapped in the overhead byte of the previous OPUk TS; (3) map each byte in the payload area of the OPUk TS frame to each byte of the OPUk TS corresponding to this client signal in the OPUk respectively; and (4) map the number of bytes of the client signal in the OPUk TS overhead byte to the OPUk overhead byte.

Figure 8:
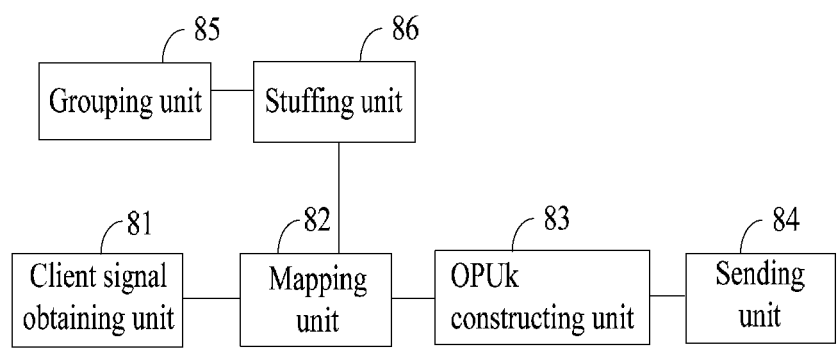
FIG. 8 shows a logical depiction of a client signal transmitting device according to another embodiment of the present invention.

The structure in the foregoing embodiment may further include a grouping unit and a stuffing unit. FIG. 8 shows a device for transmitting client signals in an OTN in another embodiment of the present invention. The client signal obtaining unit 81, mapping unit 82, OPUk constructing unit 83, and sending unit 84 are the same as those in the foregoing embodiment.

The grouping unit 85 is adapted to determine the number (n) of OPUk TSs in the OPUk payload area, where each OPUk TS occupies the OPUk payload area bytes by using the number (n) of the OPUk TSs as a cycle, and the number (n) of the OPUk TSs ranges from 2 to 127.

The stuffing unit 86 is adapted to: stuff the corresponding fixed byte positions in each row of the OPUk payload area with invalid data according to the number (n) of the OPUk TS determined by the grouping unit so that the number of non-stuffed bytes in each row of the OPUk payload area is an integer multiple of the number (n) of the OPUk TSs.

Figure 9:
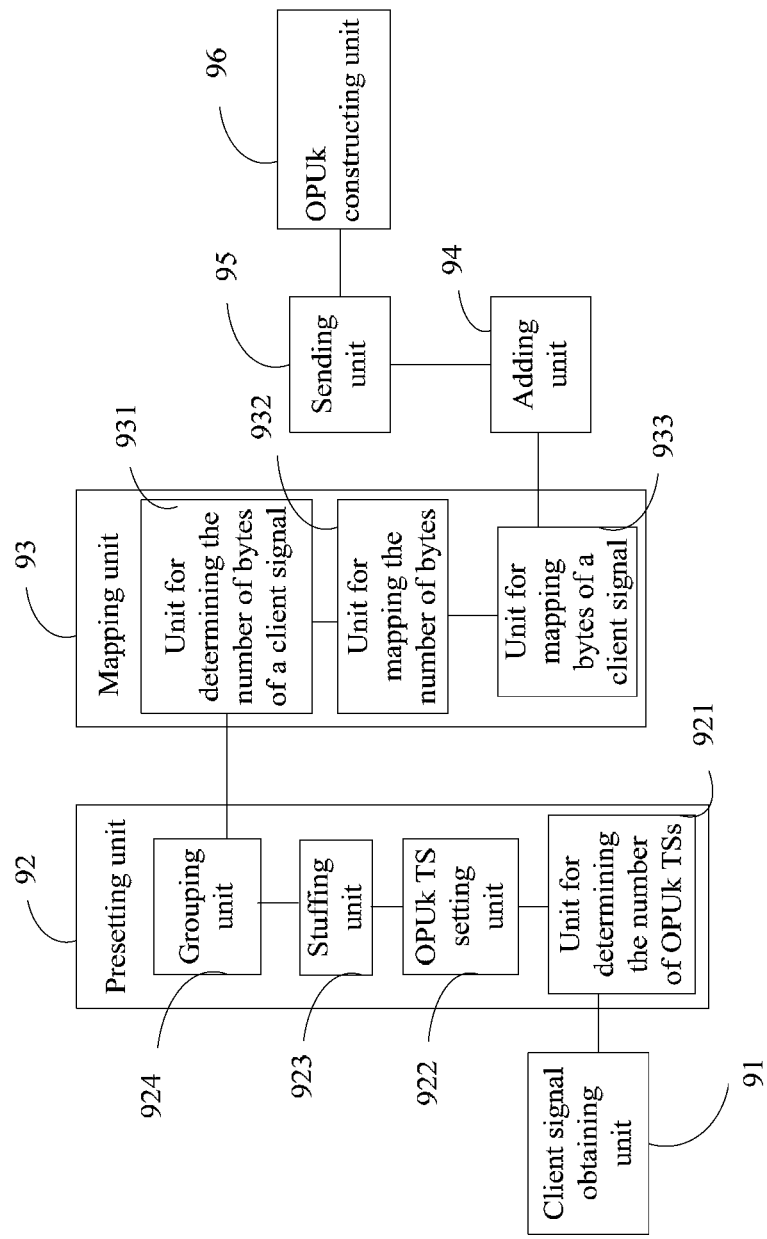
FIG. 9 shows a logical depiction of a client signal transmitting device according to yet another embodiment of the present invention.

A device for transmitting client signals in an OTN is provided in another embodiment of the present invention. As shown in FIG. 9, the device includes: (1) a client signal obtaining unit 91, adapted to obtain the client signals; (2) a presetting unit 92, adapted to preset OPUk TSs of an OPUk according to the client signals; (3) a mapping unit 93, adapted to map the client signals onto the preset OPUk TSs of the OPUk in an agnostic CBR mapping mode; (4) an adding unit 94, adapted to add an overhead into the OPUk; and (5) a sending unit 95, adapted to send the OPUk to the OTN.

Preferably, the presetting unit 92 includes: (1) a unit 921 for determining the number of OPUk TSs, adapted to determine the number of OPUk TSs of the OPUk according to the type of the client signal and the bit rate of the OPUk; and (2) an OPUk TS setting unit 922, adapted to determine the OPUk TSs according to the number of OPUk TSs, where the OPUk TSs occupy the OPUk bytes by using the number of OPUk TSs as a cycle.

Preferably, the presetting unit 92 includes at least one of the following units: (1) a stuffing unit 923, adapted to: stuff the fixed byte positions of the OPUk with invalid data so that the number of non-stuffed bytes of the OPUk is an integer multiple of the number of the OPUk TSs; and (2) a grouping unit 924, adapted to: group the preset OPUk TSs of the OPUk, and let the OPUk TSs in the same group constitute a channel for transmitting client signals, where the grouping state may be identified by an overhead identifier in the OPUk.

Preferably, the mapping unit 93 may include: (1) a unit 931 for determining the number of bytes of a client signal, adapted to determine the number of bytes (Cn) of the first client signal according to the rate of the first client signal among the client signals and the OPUk TS rate corresponding to the first client signal; (2) a unit 932 for mapping number of bytes, adapted to map the number of bytes (Cn) of the first client signal to the overhead of the OPUk TS corresponding to the first client signal; and (3) a unit 933 for mapping bytes of a client signal, adapted to map the bytes of a client signal of this number of bytes (Cn) to the OPUk TS corresponding to the first client signal.

Preferably, the mapping unit may include a hybrid mapping unit, adapted to: (1) map the first client signal among the client signals to the OPUk TS corresponding to the first client signal in an agnostic mapping mode; and (2) map the second client signal among the client signals to the OPUk TS corresponding to the second client signal in a GFP mapping mode or an ATM cell mapping mode.

Preferably, the device further includes an OPUk constructing unit 96, adapted to: add a control identifier into the overhead added in the OPUk for at least one of the following purposes: identifying the OPUk TS corresponding to each client signal, identifying the number of OPUk TSs in the OPUk payload area, identifying the type of the client signals mapped in the OPUk TS, and identifying the mode of mapping the client signal to the OPUk TS.

In this embodiment, the functions of the units in the device for transmitting client signals in an OTN are the same as those in the foregoing embodiment, and are not repeated here any further.

Figure 10:
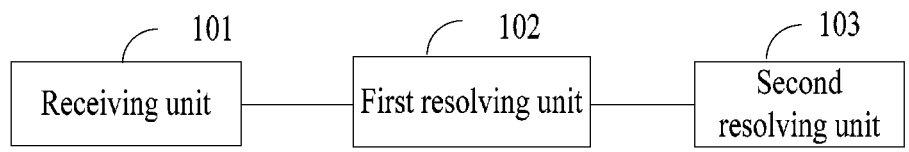
FIG. 10 shows a logical depiction of a client signal receiving device according to an embodiment of the present invention.

A device for receiving client signals in an OTN is provided in an embodiment of the present invention. As shown in FIG. 10, the device includes: (1) a receiving unit 101, adapted to receive an OPUk; (2) a first resolving unit 102, adapted to: identify an agnostic CBR mapping mode of an OPUk TS according to an overhead in the OPUk, and resolve the OPUk to obtain the OPUk TS; (3) for example, extract the number of OPUk TSs indicated in the OPUk overhead byte, construct an ODTUan-k frame structure composed of 4n×int(3808/n) bytes, and resolve out the ODTUan-k, where n is the number of OPUk TSs; and (4) a second resolving unit 103, adapted to resolve the OPUk TS of the OPUk in the agnostic CBR mapping mode to obtain the client signals.

Specifically, if the client signal is mapped to the OPUk frame in an agnostic CBR mapping mode, the functions of the units of the device for receiving client signals in an OTN are as follows:

The receiving unit 101 is adapted to receive an OPUk, which may be included in an ODUk.

The first resolving unit 102 is adapted to resolve out an ODTUan-k, and more specifically, extract the number of OPUk TSs (n) indicated in the OPUk overhead byte, construct an ODTUan-k frame structure composed of 4n×int (3808/n) bytes, and resolve out an ODTUan-k according to the mapping relation between the number of bytes of the client signal indicated in the overhead byte of the OPUk and the OPUk TS. In the case that the OPUk TSs are bundled, the first resolving unit extracts the number of OPUk TSs (n) indicated in the OPUk overhead byte, and constructs an ODTUan-k frame structure composed of 4n×int(3808/n)× bytes in light of the OPUk TS group identifier indicated in the OPUk overhead byte, where x represents the number of OPUk TSs with the same group identifier.

Preferably, the second resolving unit 103 includes: (1) a unit for resolving the number of bytes of a client signal, adapted to: resolve the overhead of the OPUk TS of the OPUk to obtain the number of bytes (Cn) of the corresponding client signal, and resolve out the clock information of the corresponding client signal according to the number of bytes (Cn) of the client signal; and (2) a client signal resolving unit, adapted to demap the client signals in the OPUk TS of the OPUk according to the number of bytes (Cn) and the clock information of the client signals, and recover the client signals.

That is, the second resolving unit 103 recovers the client signal clock according to the number of the bytes of the client signal in the ODTUan-k overhead, and recovers the client signal data flow according to the client signals mapped in the ODTUan-k payload area and the type of the client signals indicated in the OPUk overhead byte.

In this embodiment, the OPUk TSs are grouped and allocated according to the rate of different client signals on the basis of the OPUk frame structure to improve efficiency and flexibility of transmitting various client signals, and the agnostic CBR mapping mode in the ITU-T SG15 G.709 living list is applied to implement transparent agnostic CBR transmission for various client signals of different rates. Therefore, it is not necessary to define a fixed mapping mode for each client signal of a different rate. Embodiments of the present invention enable effective access of various existing client signals, and are highly agnostic to the client signals of new rates that will come forth in the future. This makes the OTN standard system more agnostic to the client signals and the OTN device more flexibly agnostic to the accessing client signals, and improves the bandwidth utilization ratio of the line.

Figure 11:
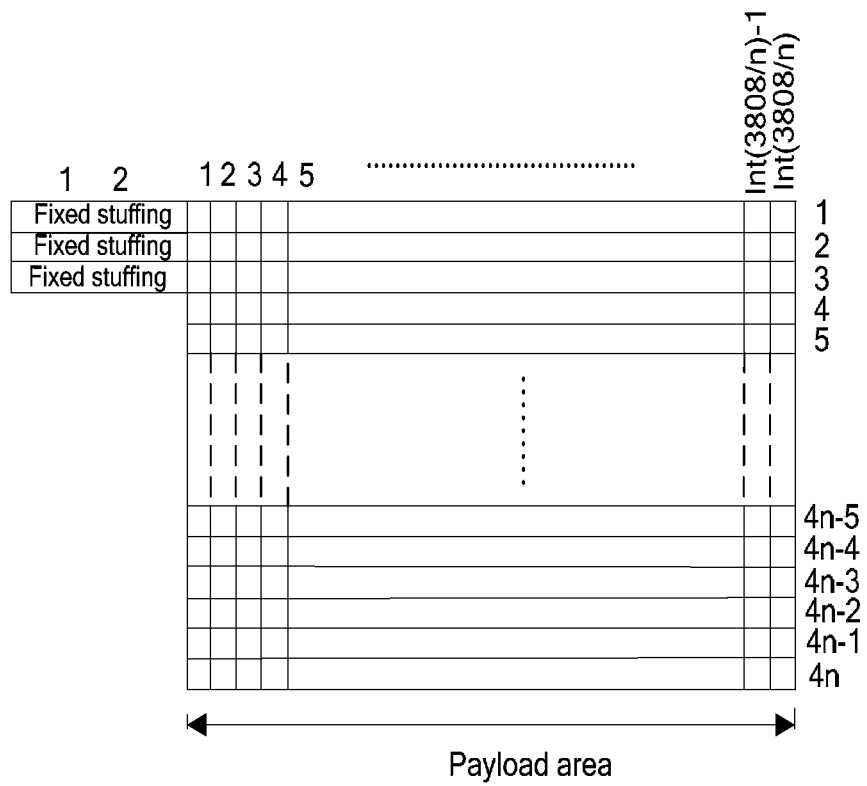
FIG. 11 shows a structure of an ODTUn-k that employs a GFP or ATM cell mapping mode according to an embodiment of the present invention.

For the OPUk TS-n structure, each OPUk TS can use an agnostic CBR mapping method, or use a GFP or ATM cell mapping method already defined in the G.709, or combination thereof. In this case, the PSI[2m] may be further defined so that it indicates both the service type and the mapping mode, as shown in Table 7.

a reserved byte. The definition of other bytes of the frame structure may remain unchanged. FIG. 11 shows a structure of an ODTUn-k frame that employs a GFP or ATM cell mapping mode. The position that previously holds a Cbyte now holds a fixed stuff byte.

On the occasion of mapping a data packet to an ODTUn-k in a GFP mode, the data packet is encapsulated into a GFP frame based on the G.7041, and then each byte of the GFP frame is put into an ODTUn-k structure. The clock deviation between the GFP frame and the ODTUn-k is corrected through idle frames.

The ATM cell mapping method is similar to the GFP frame mapping method except there is no need to encapsulate the ATM cell into a GFP frame.

Figure 12:
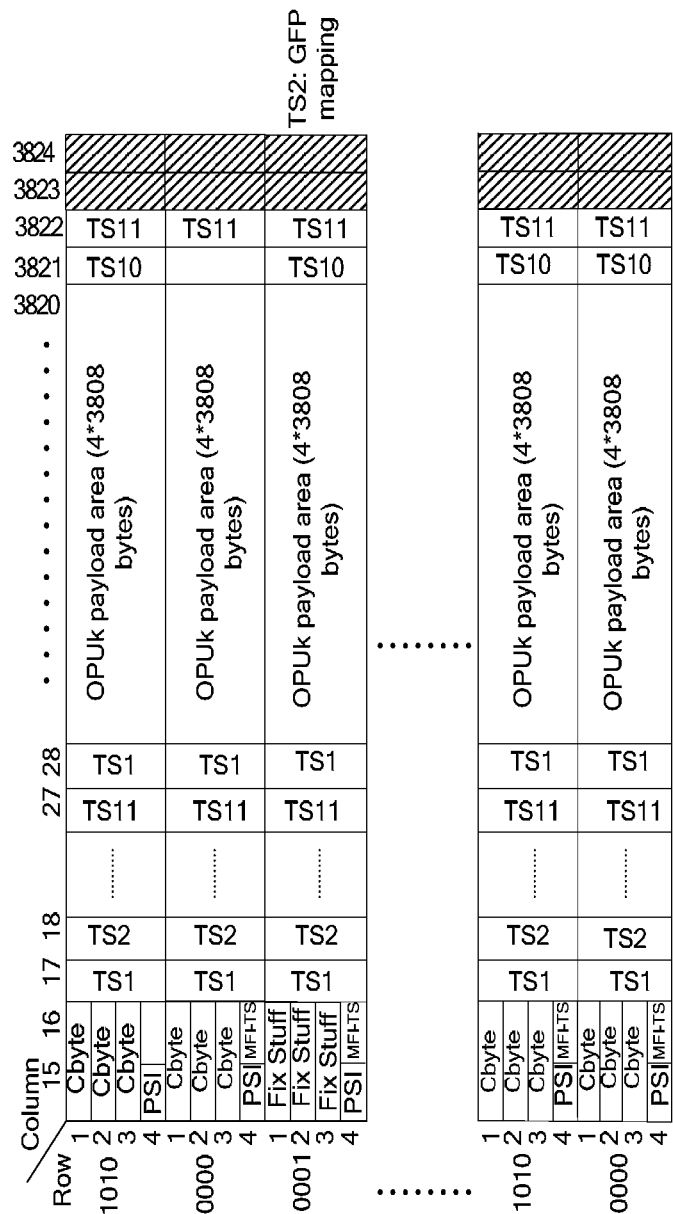
FIG. 12 shows an OPUk TS-11 frame structure which employs a GFP mapping mode at TS2 according to an embodiment of the present invention.

The method of mapping from an ODTUn-k to an OPUk in a GFP or ATM mapping mode is the same as the method of mapping from an ODTUan-k to an OPUk in agnostic CBR mapping mode. In this way, the position that previously holds the Cbyte corresponding to the OPUk TS based on a GFP or ATM mapping method now holds a fixed stuff byte. In the 11 OPUk TSs shown in FIG. 12, the TS2 employs a GFP mapping mode, and other TSs employ an agnostic CBR mapping mode.

Described above are methods and devices for transmitting client signals in an OTN in embodiments of the present invention. As will be apparent to one of ordinary skill in the art, the various "units" contained within the devices for transmitting and receiving described above are logical entities that may be physically implemented with hardware (e.g., processors or ASICs) or a combination of hardware and software and using shared or separate components.

Although the invention is described through some exemplary embodiments, the invention is not limited to such

TABLE 7

| PSI[2m] 7-6 bit | Mapping method | PSI[2m] 5-0 bit (Hex) | Service type | Line rate (Gbps) |
|---|---|---|---|---|
| 00 | Agnostic CBR | 01 | Enterprise system connection (ESCON) | 0.2 |
| | | 02 | Digital video broadcast (DVBASI) | 0.216 |
| | | 03 | Fiber channel | 0.53125 |
| | | 04 | Fiber channel (FC-1G) | 1.065 |
| | | 05 | Gigabit Ethernet (GE) | 1.25 |
| | | 06 | High Definition Television (HDTV) | 1.485 |
| | | 07 | Fiber channel (FC-2G) | 2.125 |
| | | 08 | Synchronous Transfer Mode (STM-16) | 2.488320 |
| | | 09 | ODU1 | 2.498775 |
| | | 10-1f | Reserved | |
| | | 20 | Fiber channel (FC-4G) | 4.25 |
| | | 21 | Fiber channel (FC-8G) | 8.5 |
| | | 22 | Synchronous Transfer Mode (STM-64) | 9.95328 |
| | | 23 | ODU2 | 10.037273924 |
| | | 24 | Gigabit Ethernet (10 GE) (LAN) | 10.3125 |
| | | 25 | Fiber channel (FC-10G) | 10.52 |
| | | 26-2f | Reserved | |
| | | 30 | Gigabit Ethernet (100 GE-5L) | 20.625 |
| | | 31 | Gigabit Ethernet (100 GE-4L) | 25.78125 |
| | | 32 | Synchronous Transfer Mode (STM-256) | 39.81312 |
| | | 33 | ODU3 | 40.319218983 |
| | | 34-3F | Reserved | |
| 01 | GFP | 00 | GFP-F | |
| | | 01 | GFP-T | |
| 10 | ATM cell | | | |
| 11 | Reserved | | | |

When an OPUk TS employs a GFP or ATM cell mapping mode, because such modes insert idle frames to compensate for the rate deviation, the Cbyte corresponding to the OPUk TS does not need to be put into use, and may be stuffed as embodiments. It is apparent that those skilled in the art can make modifications and variations to the invention without departing from the spirit and scope of the invention. The invention is intended to cover the modifications and variations provided that they fall in the scope of protection defined by the following claims or their equivalents.

What is claimed is:

1. A method for transmitting client signals in an Optical Transport Network (OTN) comprising:
   mapping a client signal into a first Optical Channel Data Tributary Unit (ODTU) frame including an ODTU payload area and an ODTU overhead area, such that a plurality of m-bit data units of the client signal are inserted into the ODTU payload area and number information is inserted into the ODTU overhead area; wherein the number information indicates a quantity of the m-bit data units to be inserted into a second ODTU frame; wherein the ODTU payload area has multiple columns and a plurality of 4 rows that depend on a quantity of multiple Tributary Slots (TSs) divided in an Optical Channel Payload Unit-k (OPUk) payload area of an OPUk frame, wherein the OPUk payload area includes 4 rows, 3808 columns;
   mapping the first ODTU frame into the OPUk frame, such that the plurality of the m-bit data units are mapped into an OPUk payload part occupying at least one Tributary Slot (TS) of the OPUk payload area and the number information of the ODTU overhead area is mapped into a first OPUk overhead part of the OPUk frame; and
   forming an Optical Channel Transport Unit-k (OTUk) frame including the OPUk frame for transmission.

2. The method of claim 1, wherein both the ODTU overhead area and the first OPUk overhead part have six bytes.

3. The method of claim 1, wherein the ODTU payload area consists of 4n rows and int(3808/n) columns, n indicating a quantity of the multiple TSs.

4. The method of claim 1, wherein the OPUk frame comprises a second OPUk overhead part located in row 4, column 16, and the second OPUk overhead part includes a multiframe indicator that will be incremented each OPUk frame to provide a multiframe with n frames, wherein n equals to a quantity of the multiple TSs.

5. The method of claim 4, wherein the plurality of the m-bit data units are a plurality of bytes.

6. The method of claim 1, wherein the ODTU payload area consists of 4n rows and k*int(3808/n) columns, n indicating the number of the multiple TSs, k indicating a quantity of TSs that are occupied by the client signal.

7. An apparatus in an optical transport network comprising:
   a first mapping unit configured to map a client signal into a first Optical Channel Data Tributary Unit (ODTU) frame including an ODTU payload area and an ODTU overhead area, such that a plurality of m-bit data units of the client signal are inserted into the ODTU payload area and number information is inserted into the ODTU overhead area; wherein the number information indicates a quantity of the m-bit data units to be inserted into a second ODTU frame; wherein the ODTU payload area has multiple columns and a plurality of 4 rows that depend on a quantity of multiple Tributary Slots (TSs) divided in an Optical Channel Payload Unit-k (OPUk) payload area of an OPUk frame, wherein the OPUk payload area includes 4 rows, 3808 columns;
   a second mapping unit configured to map the first ODTU frame into the OPUk frame, such that the plurality of the m-bit data units are mapped into an OPUk payload part of the OPUk frame corresponding to at least one Tributary Slot (TS) of the OPUk frame and the number information of the ODTU overhead area is mapped into a first OPUk overhead part of the OPUk frame; and
   a transmitter configured to transmit an Optical Channel Transport Unit-k (OTUk) frame including the OPUk frame.

8. The apparatus of claim 7, wherein both the ODTU overhead area and the first OPUk overhead part have six bytes.

9. The apparatus of claim 7, wherein the ODTU payload area consists of 4n rows and int(3808/n) columns, n indicating a quantity of the multiple TSs.

10. The apparatus of claim 7, wherein the OPUk frame comprises a second OPUk overhead part located in row 4, column 16, and the second OPUk overhead part includes a multiframe indicator that will be incremented each OPUk frame to provide a multiframe with n frames, wherein n equals to the quantity of the multiple TSs.

11. The apparatus of claim 10, wherein the plurality of the m-bit data units are a plurality of bytes.

12. The apparatus of claim 7, wherein the ODTU payload area consists of 4n rows and k*int(3808/n) columns, n indicating the number of the multiple TSs, k indicating a quantity of TSs that are occupied by the client signal.

13. A method for receiving client signals in an Optical Transport Network (OTN) comprising:
   receiving an Optical Channel Payload Unit-k (OPUk) frame including an OPUk payload area that includes 4 rows, 3808 columns and divided into multiple Tributary Slots (TSs); wherein at least one of the multiple TSs is inserted with a plurality of m-bit data units of a client signal, wherein a first OPUk overhead part of the OPUk frame carries number information indicating a quantity of the m-bit data units;
   demapping the OPUk frame to form a first Optical Channel Data Tributary Unit (ODTU) frame including an ODTU payload area and an ODTU overhead area, wherein the plurality of the m-bit data units are inserted into the ODTU payload area and the number information is inserted into the ODTU payload area, wherein the ODTU payload area has multiple columns and a plurality of 4 rows that depend on a quantity of the multiple TSs; and
   demapping the first ODTU frame to recover data stream of the client signal, wherein the number information of the first ODTU frame is used for recovering data stream of a second ODTU frame of the client signal.

14. The method of claim 11, wherein both the ODTU overhead area and the first OPUk overhead part have six bytes.

15. The method of claim 13, wherein the ODTU payload area consists of 4n rows and int(3808/n) columns, n indicating the quantity of the multiple TSs.

16. The method of claim 13, wherein the OPUk frame comprises a second OPUk overhead part located in row 4, column 16, the second OPUk overhead part includes a multiframe indicator that will be incremented each OPUk frame to provide a multiframe with n frames, wherein n equals to the quantity of the multiple TSs.

17. The method of claim 16, wherein the plurality of m-bit data units are a plurality of bytes.

18. The method of claim 13, wherein the ODTU payload area consists of 4n rows and k*int(3808/n) columns, n indicating the number of the multiple TSs, k indicating a quantity of TSs that are occupied by the client signal.

19. An apparatus in an optical transport network comprising:

a receiver configured to receive an Optical Channel Payload Unit-k (OPUk) frame including an OPUk payload area that includes 4 rows, 3808 columns and divided into multiple Tributary Slots (TSs); wherein at least one of the multiple TSs is inserted with a plurality of m-bit data units of a client signal, wherein a first OPUk overhead part of the OPUk frame carries number information indicating a quantity of the m-bit data units;

a first demapping unit configured to demap the OPUk frame to form a first Optical Channel Data Tributary Unit (ODTU) frame including an ODTU payload area and an ODTU overhead area, wherein the plurality of the m-bit data units are inserted into the ODTU payload area and the number information is inserted into the ODTU payload area, wherein the ODTU payload area has multiple columns and a plurality of 4 rows that depend on a quantity of the multiple TSs; and a second demapping unit configured to demap the first ODTU frame to recover data stream of the client signal, wherein the number information of the first ODTU frame is used for recovering data stream of a second ODTU frame of the client signal.

20. The apparatus of claim 19, wherein both the ODTU overhead area and the first OPUk overhead part have six bytes.

21. The apparatus of claim 19, wherein the ODTU payload area consists of 4n rows and int(3808/n) columns, n indicating the quantity of the multiple TSs.

22. The apparatus of claim 19, wherein the OPUk frame comprises a second OPUk overhead part located in row 4, column 16, the second OPUk overhead part includes a multiframe indicator that will be incremented each OPUk frame to provide a multiframe with n frames, wherein n equals to the quantity of the multiple TSs.

23. The apparatus of claim 22, wherein the plurality of m-bit data units are a plurality of bytes.

24. The apparatus of claim 19, wherein the ODTU payload area consists of 4n rows and k*int(3808/n) columns, n indicating the number of the multiple TSs, k indicating a quantity of TSs that are occupied by the client signal.

25. An apparatus in an optical transport network comprising:
a processor; and
a non-transitory computer readable medium having a plurality of computer executable instructions that, when executed by the processor, cause the processor to perform operations comprising:
mapping a client signal into a first Optical Channel Data Tributary Unit (ODTU) frame including an ODTU payload area and an ODTU overhead area, such that a plurality of m-bit data units of the client signal are inserted into the ODTU payload area and number information is inserted into the ODTU overhead area; wherein the number information indicates a quantity of the m-bit data units to be inserted into a second ODTU frame; wherein the ODTU payload area has multiple columns and a plurality of 4 rows that depend on a quantity of multiple Tributary Slots (TSs) divided in an Optical Channel Payload Unit-k (OPUk) payload area of an OPUk frame, wherein the OPUk payload area includes 4 rows, 3808 columns;

mapping the first ODTU frame into the OPUk frame, such that the plurality of the m-bit data units are mapped into an OPUk payload part occupying at least one Tributary Slot (TS) of the OPUk payload area and the number information of the ODTU overhead area is mapped into a first OPUk overhead part of the OPUk frame; and forming an Optical Channel Transport Unit-k (OTUk) frame including the OPUk frame for transmission.

26. The apparatus of claim 25, wherein both the ODTU overhead area and the first OPUk overhead part have six bytes.

27. The apparatus of claim 25, wherein the ODTU payload area consists of 4n rows and int(3808/n) columns, n indicating a quantity of the multiple TSs.

28. An apparatus in an optical transport network comprising:
a processor; and
a non-transitory computer readable medium having a plurality of computer executable instructions that, when executed by the processor, cause the processor to perform operations comprising:
receiving an Optical Channel Payload Unit-k (OPUk) frame including an OPUk payload area that includes 4 rows, 3808 columns and divided into multiple Tributary Slots (TSs); wherein at least one of the multiple TSs is inserted with a plurality of m-bit data units of a client signal, wherein a first OPUk overhead part of the OPUk frame carries number information indicating a quantity of the m-bit data units;
demapping the OPUk frame to form a first Optical Channel Data Tributary Unit (ODTU) frame including an ODTU payload area and an ODTU overhead area, wherein the plurality of the m-bit data units are inserted into the ODTU payload area and the number information is inserted into the ODTU payload area, wherein the ODTU payload area has multiple columns and a plurality of 4 rows that depend on a quantity of the multiple TSs; and
demapping the first ODTU frame to recover data stream of the client signal, wherein the number information of the first ODTU frame is used for recovering data stream of a second ODTU frame of the client signal.

29. The apparatus of claim 28, wherein both the ODTU overhead area and the first OPUk overhead part have six bytes.

30. The apparatus of claim 28, wherein the ODTU payload area consists of 4n rows and int(3808/n) columns, n indicating the quantity of the multiple TSs.

* * * * *

UNITED STATES PATENT AND TRADEMARK OFFICE
CERTIFICATE OF CORRECTION

PATENT NO. : 9,819,431 B2  
APPLICATION NO. : 14/339734  
DATED : November 14, 2017  
INVENTOR(S) : Dong et al.

Page 1 of 1

It is certified that error appears in the above-identified patent and that said Letters Patent is hereby corrected as shown below:

On the Title Page

Item (57), Abstract, Line 2, "MN" should read -- ON --.

Signed and Sealed this  
Third Day of July, 2018

Andrei Iancu  
*Director of the United States Patent and Trademark Office*